Nov. 1, 1966  T. J. DAHMUS  3,282,251
BIRD HOUSE
Filed Aug. 11, 1965

Theodore J. Dahmus,
Inventor.
Koenig, Pope,
Senniger and Powers,
Attorneys.

United States Patent Office 3,282,251
Patented Nov. 1, 1966

3,282,251
BIRD HOUSE
Theodore J. Dahmus, 3160 Myrtle Ave., Granite City, Ill.
Filed Aug. 11, 1965, Ser. No. 482,999
8 Claims. (Cl. 119—23)

This application is a continuation-in-part of my copending application for Bird House, Serial No. 237,018, filed November 13, 1962, now abandoned.

This invention relates to bird houses, and more particularly to a bird house especially adapted for observation of the activities of a bird or birds occupying the bird house.

Among the several objects of the invention may be noted the provision of a bird house which is especially adapted to be mounted on a window of a building and so constructed that persons in the building may observe activities of a bird or birds in the bird house; the provision of a bird house such as described which is so constructed as to enable such observation without frightening or scaring away the bird or birds; the provision of a bird house such as described which is so constructed as to be of light weight and which has means, and more particularly cooperable fastener members, for detachably securing it to a window; the provision of a bird house such as described as to which the interior is readily accessible for cleaning; the provision of a bird house so constructed as to be thermally insulated thereby to keep nestlings therein from becoming overheated; and the provision of a bird house constructed for passing light into the bird house so that its interior is illuminated for observation of birds in the bird house. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated.

Corresponding reference characters indicate corresponding parts throughout the several views of the drawings.

Figure 1:
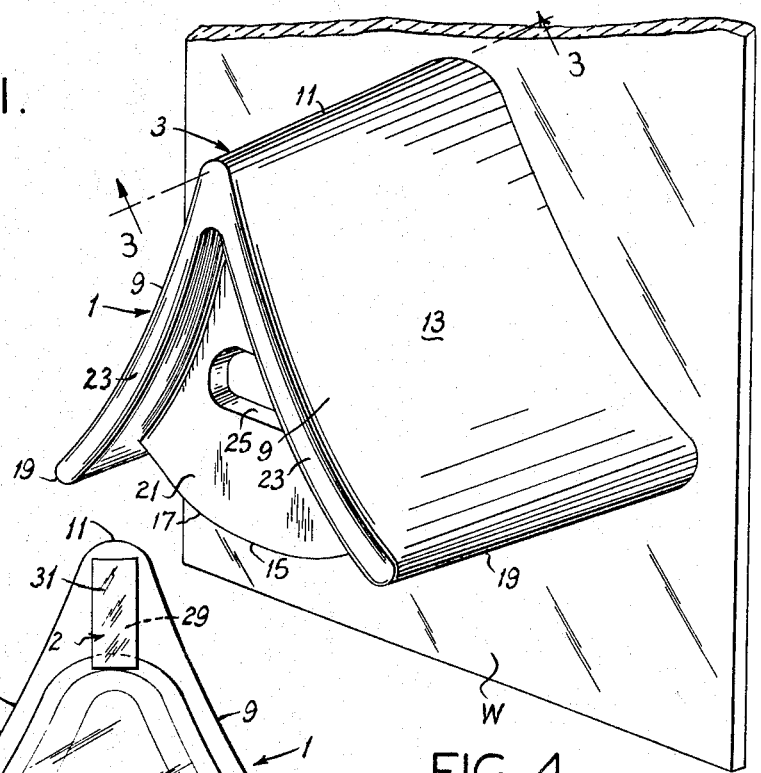
FIG. 1 is a perspective of a bird house constructed in accordance with this invention and showing the bird house detachably connected to a window.
Figure 2:
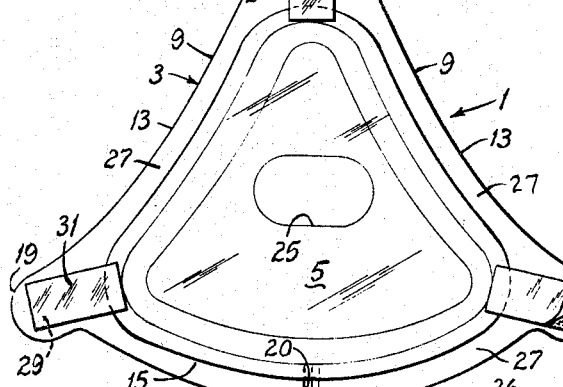
FIG. 2 is a rear elevation of the bird house of FIG. 1 shown removed from the window.
Figures 4, 5:
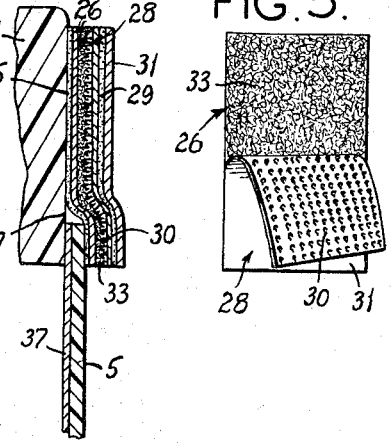
FIG. 4 is an enlarged fragmentary section showing the securing means for the bird house.
FIG. 5 is an enlarged elevation of the cooperable fastener members comprising the securing means for the bird house.
Figure 3:
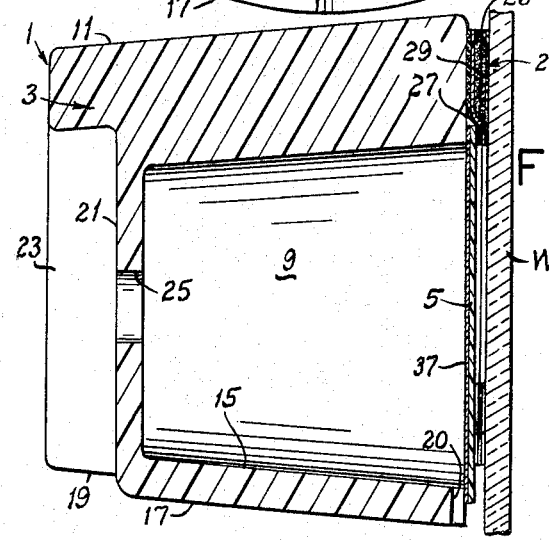
FIG. 3 is a section taken generally on line 3—3 of FIG. 1.

Referring to the drawings, a bird house constructed in accordance with this invention is indicated in its entirety by the reference numeral 1. FIG. 1, the bird house is shown detachably secured to a window W of a building on the outside of the window so that persons in the building may observe the activities of a bird or birds in the bird house from the inside of the building.

The bird house 1 comprises a lightweight molded plastic body 3 which is open at the rear and which has a one-way window or transparent mirror 5 detachably secured to the rear as will be explained. Body 3 has inclined sides 9 which diverge from ridge 11, these sides having a generally concave outer surface 13. A bottom 15 connects sides 9 and has a convex outer surface 17. Bottom 15 merges with sides 9 adjacent rounded bottom edges 19. It is inclined downward from front to rear and has a slot 20 at its rear intermediate edges 19 providing a drain hole to permit rain or water which might seep or be blown inside bird house 1 to drain out. Body 3 further comprises a front 21 merging with sides 9 and bottom 15. Front 21 has an elongated opening 25 therethrough of a size sufficient to permit the ingress and egress of a bird. Front edges 23 of sides 9 project outwardly from front 21 and thereby form eaves which tend to protect opening 25 from rain and the like. Sides 9 slant or slope inwardly from their rear ends and in conjunction with the slope of the bottom this provides a pleasing outer appearance to the bird house.

Body 3 is preferably formed of a lightweight rigid closed-cell cellular plastic material, being molded from expansible polystyrene sold under the trademark "Pelaspan" by Dow Chemical Company, Midland, Michigan. This material is translucent and, as a result, the bird house readily transmits light so that the interior is illuminated for observation of birds in the bird house. Suitable molds may be employed as well known in which to form body 3 from such plastic material.

The rear of bird house 1 is adapted to be detachably secured to the outer flat surface of a window W in a building by a plurality of fasteners, three such fasteners being shown positioned adjacent ridge 11 and edges 19. Each fastener comprises a pair of cooperable fastener members 26 and 28 preapplied to the rear edge 27 of body 3. The outer fastener member 28 comprises a piece of fabric material having adhesive 29 on the outside thereof, preferably a waterproof adhesive, and which may be a pressure-sensitive adhesive, whereby it may be adhered to the outside of window W. This element 28 has a multiplicity of hook-like pile elements 30 projecting therefrom of the nature shown in De Mestral U.S. Patent 2,717,437, issued September 13, 1955. A removable cover strip 31 may be used to cover adhesive 29. When it is desired to apply bird house 1 to window W, cover strips 31 are peeled off and bird house 1 is pressed against window W. Adhesive 29 thereupon holds the bird house in position. Each inner fastener member 26 on rear edge 27 comprises a piece of fabric having a pile surface as indicated at 33 secured to edge 27 by adhesive 35 with the pile surface adapted for interengagement with the hook-like pile elements 30 for detachably securing bird house 1 to window W. Bird house 1 may be detached by separating elements 30 and pile surface 33, fastener members 28 then remaining on window W. Fastener material such as used for members 26 and 28 is available commercially under the trade name Velcro.

One-way window 5 comprises a sheet of transparent plastic material, such as cellulose acetate, metallized on its inner face 37 with a suitable metal, such as aluminum, with the metal film of such thickness as to reduce the light transmission characteristics of the plastic in such a manner as to form a one-way window. This permits a person to observe the interior of the bird house through window 5 but will not permit the bird to see through window 5 from the inside of the bird house. To secure window 5 to rear edge 27 of body 3, fastener members 26 overlap window 5 and adhesive 35 on the inner face of fastener members 26 secures window 5 in position. Adhesive 35 is preferably of a pressure-sensitive adhesive to permit window 5 to be removed, thereby to allow cleaning the inside of the bird house, and is preferably waterproof. Adhesives 29 and 35 are of an adhering strength or capacity greater than the adherence of pile surface 33 and hook-like pile elements 30 so that bird house 1 may be pulled from window W by the separation of surfaces 33 and pile elements 30 without the disturbance of adhesives 29 and 35.

In order for the interior to be easily visible through such a one-way window, the interior is preferably more brightly illuminated than the room occupied by the viewer. The translucent body from which the bird house is made transmits sufficient light to illuminate the interior for observing birds from inside a room.

Bird house 1 is particularly adaptable for wrens which commonly build nests with twigs. Opening 25 is elongated to permit a wren to gain entry through opening 25 while carrying a twig. Further, opening 25 is of a size sufficiently small to prevent the entrance of squirrels, etc.

Being formed of closed-cell cellular plastic material, the bird house is not only light in weight so that it may be secured to window W by fastening means such as described, but it also has heat-insulating characteristics which prevent the interior of the bird house from becoming overheated thereby to protect nestlings in the bird house.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A bird house having a front with an opening therein to permit the ingress and egress of a bird and having an opening at the rear, and a one-way window over the rear opening so that the interior of the bird house may be observed from the outside but a bird cannot see out, the bird house having securing means at the rear whereby the bird house may be removably secured at the rear to a window of a building, the securing means comprising a pair of cooperable fastener members one of which comprises a piece of fabric material having a multiplicity of of hook-like pile elements projecting therefrom and the other comprises a piece of fabric having a pile surface adapted for interengagement with said hook-like elements, the outer of said members being adapted to be adhered to the window of a building.

2. A bird house as set forth in claim 1 wherein the inner fastener member is adhered thereto by adhesive, said one-way window is removably secured to the bird house by the inner fastener member and adhesive overlapping the one-way window.

3. A bird house adapted to be detachably mounted on a window of a building, said bird house having a pair of sides diverging from a ridge, a bottom connecting the sides, and a front having an opening threthrough of a size sufficient to permit ingress and egress of a bird, said bird house having an opening at its rear, a one-way window over said rear opening whereby an observer may view the interior of the bird house through said building window, but a bird cannot see out through the building window, and pairs of cooperable fastener members at the rear of the bird house for securing the bird house to the building window, one of the cooperable fastener members of each pair comprising a piece of fabric material having a multiplicity of hook-like pile elments projecting therefrom and the other fastener member comprising a piece of fabric having a pile surface adapted for interengagement with said hook-like elements.

4. A bird house molded of lightweight plastic having an opening at the front for ingress and egress of a bird and an observation opening at the rear, and pairs of cooperable fastener members at the rear of the bird house for detachably mounting it on the window of a building, one fastener member of each pair being secured to the rear of the bird house and the other member being adapted to be mounted on a window, the inner fastener member of each pair being adhered to the rear of the bird house and the outer fastener member having adhesive on the outside thereof for adhering it to the window of a building.

5. A bird house as set forth in claim 4 having a one-way window detachably secured over said observation opening whereby an observer may see in but a bird cannot see out through said observation opening, said one-way window being detachably secured to the rear of the bird house by the inner fastener members and adhesive overlapping the one-way window.

6. A bird house having a front with an opening therein to permit the ingress and egress of a bird and having an opening at the rear, the bird house being made of a translucent material whereby the interior of the bird house can be illuminated by light passing through the bird house, and a one-way window over the rear opening so that the interior of the house may be observed from the outside but a bird cannot see out through said window.

7. A bird house as set forth in claim 6 in which the bird house has securing means at the rear whereby the bird house may be removably secured at the rear to a window of a building.

8. A bird house as set forth in claim 7 wherein the bird house is made of polystyrene plastic.

References Cited by the Examiner

UNITED STATES PATENTS

| 1,169,409 | 1/1916 | Larson | 119—23 |
| 2,080,160 | 5/1957 | Austin | 119—1 |
| 3,087,460 | 4/1963 | Stone | 119—23 |

FOREIGN PATENTS

| 516,226 | 12/1939 | Great Britain. |

SAMUEL KOREN, *Primary Examiner.*

HUGH R. CHAMBLEE, *Examiner.*